UNITED STATES PATENT OFFICE.

FRIEDRICH KRECKE, OF BIEBRICH, GERMANY, ASSIGNOR TO KALLE & CO., OF SAME PLACE.

MONOAZO BLACK DYE AND PROCESS OF MAKING SAME.

SPECIFICATION forming part of Letters Patent No. 664,955, dated January 1, 1901.

Application filed November 5, 1900. Serial No. 35,545. (No specimens.)

*To all whom it may concern:*

Be it known that I, FRIEDRICH KRECKE, a subject of the King of Prussia, Emperor of Germany, residing at Biebrich, Germany, have invented certain new and useful Improvements in the Manufacture of a Black Mordant Dyestuff, of which the following is a specification.

My present invention relates to the manufacture of a new monoazo dyestuff by combining diazotized picramic acid with 1.6 dioxynaphthalene-3-sulfonic acid. I illustrate my process by the following example: 22.1 kilos of the sodium salt of picramic acid are dissolved in five hundred liters of hot water, reprecipitated by addition of thirty kilos hydrochloric acid of thirty per cent., and transformed after cooling with ice to 10° centigrade into the diazo compound by addition of 6.9 kilos sodium nitrite dissolved in fifty liters of water. Into the diazo liquid I run a neutral solution of twenty-seven kilos sodium, 1.6 dioxynaphthalene-3-sulfonate, and subsequently I add twenty kilos crystallized sodium acetate. After the combination is finished the liquid is rendered alkaline by adding thirty kilos soda-ash. The dyestuff is then salted out, pressed, and dried.

The new dyestuff is a dark-colored powder showing metallic luster. It is easily soluble in water with reddish-violet color, in concentrated sulfuric acid with violet color, and very difficultly soluble in alcohol. It dyes a deep violet on wool from an acid-bath. By a subsequent treatment with chromium salts (sodium bichromate, chromium fluorid) the original shade is changed into a deep black, which is distinguished by an excellent fastness against the action of alkali, soap, and light.

Now what I claim is—

1. The process for the manufacture of a new monoazo dyestuff by combining diazotized picramic acid with 1.6 dioxynaphthalene-3-sulfonic acid.

2. As a new product the dyestuff obtained by combination of diazotized picramic acid with 1.6 dioxynaphthalene-6-sulfonic acid, being a dark-colored powder with metallic luster easily soluble in water with reddish-violet color, in concentrated sulfuric acid with violet color, very difficultly soluble in alcohol, dyeing on wool from an acid-bath a deep violet, which is changed into a deep black of excellent fastness by a subsequent treatment with chromium salts.

In testimony whereof I have signed my name to this specification in the presence of two subscribing witnesses.

FRIEDRICH KRECKE.

Witnesses:
JEAN GRUND,
CARL GRUND.